United States Patent
Forney et al.

(10) Patent No.: US 6,393,756 B1
(45) Date of Patent: May 28, 2002

(54) FISHING LURE

(76) Inventors: Ralph E. Forney, 8302 Sunnyview Dr., Millersville, MD (US) 21108; Herbert R. Forney, 754 Old Herald Harbor Rd., Crownsville, MD (US) 21032

(*) Notice: Subject to any disclaimer, the term of this patent is extended or adjusted under 35 U.S.C. 154(b) by 0 days.

(21) Appl. No.: 09/518,454

(22) Filed: Mar. 3, 2000

(51) Int. Cl.[7] ............................................. A01K 85/01
(52) U.S. Cl. ................................. 43/42.06; 43/42.09
(58) Field of Search ........................... 43/42.06, 42.09, 43/42, 44.99, 17.6; 222/81, 88, 482, 490, 494; 239/302, 310, 570, 571

(56) References Cited

U.S. PATENT DOCUMENTS

| | | | | |
|---|---|---|---|---|
| 2,594,387 A | * | 4/1952 | Breuer | 43/42.06 |
| 2,666,275 A | * | 1/1954 | Smith | 43/42.06 |
| 2,674,058 A | * | 4/1954 | Lindenberg | 43/42.06 |
| 2,817,179 A | * | 12/1957 | Kelley | 43/44.99 |
| 2,968,886 A | * | 1/1961 | Cotroumpas | 43/42.06 |
| 3,066,434 A | * | 12/1962 | Duller | 43/42.06 |
| 3,178,848 A | * | 4/1965 | Lane | 43/42.06 |
| 3,309,811 A | * | 3/1967 | Wimer | 43/42.06 |
| 3,654,724 A | * | 4/1972 | Charron | 43/42.06 |
| 3,835,572 A | | 9/1974 | Mounsey | 43/42.06 |
| 3,969,840 A | * | 7/1976 | Charron | 43/42.06 |
| 3,987,575 A | | 10/1976 | Morita | 43/42.06 |
| 4,267,658 A | | 5/1981 | Brown et al. | 43/42.06 |
| 4,554,756 A | | 11/1985 | Thomas | 43/42.06 |
| 4,602,453 A | | 7/1986 | Polley | 43/42.06 |
| 4,709,499 A | * | 12/1987 | Ottaviano | 43/17.6 |
| 4,823,497 A | * | 4/1989 | Pierce | 43/17.6 |
| 4,888,907 A | | 12/1989 | Gibbs | 43/42.06 |
| 4,890,411 A | | 1/1990 | Buccilli et al. | 43/42.06 |
| 4,903,430 A | * | 2/1990 | DeWan | 43/44.99 |
| 4,962,609 A | | 10/1990 | Walker | 43/42.06 |
| 4,964,235 A | | 10/1990 | Gruelle | 43/42.06 |
| 4,998,370 A | * | 3/1991 | Lawler et al. | 43/42.06 |
| 5,079,013 A | * | 1/1992 | Belanger | 222/490 |
| 5,155,947 A | | 10/1992 | Rivard | 43/42.06 |
| 5,321,906 A | | 6/1994 | Bommarito | 43/44.99 |
| 5,400,542 A | * | 3/1995 | Johnson | 43/42.06 |
| 5,444,935 A | * | 8/1995 | Pahle | 43/42.06 |
| 5,471,780 A | * | 12/1995 | Hopson | 43/42.06 |
| 6,108,960 A | * | 8/2000 | Sylla et al. | 43/42.09 |
| 6,192,617 B1 | * | 2/2001 | Lyles | 43/42.06 |

* cited by examiner

*Primary Examiner*—Darren W. Ark
(74) *Attorney, Agent, or Firm*—Leonard Bloom; Sam Rosen

(57) ABSTRACT

A fishing lure having disposed therein a needle for puncturing the diaphragm on a tube of fish attractant. The tube of fish attractant has a check-valve at the end opposite the diaphragm. In use, the diaphragm is punctured and the lure is ready for use. A kit of color-coded tubes (vials) of attractant is to be supplied for use with fishing lures.

5 Claims, 4 Drawing Sheets

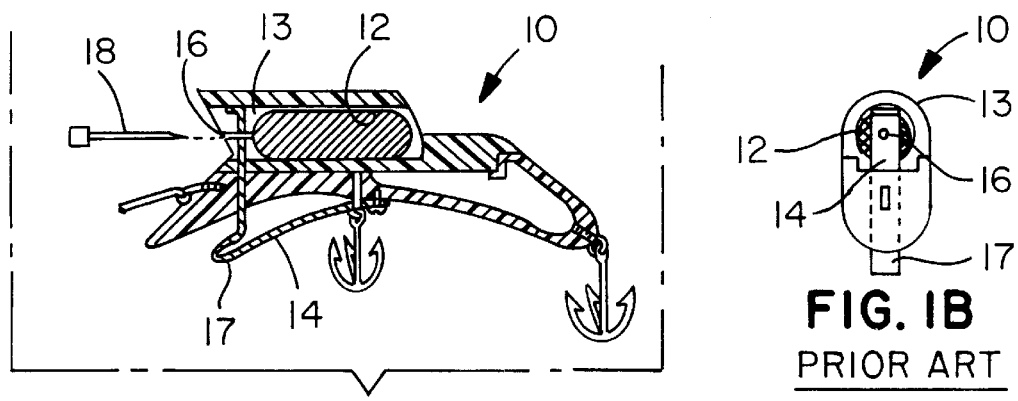
FIG. 1A
PRIOR ART
FIG. 1B
PRIOR ART
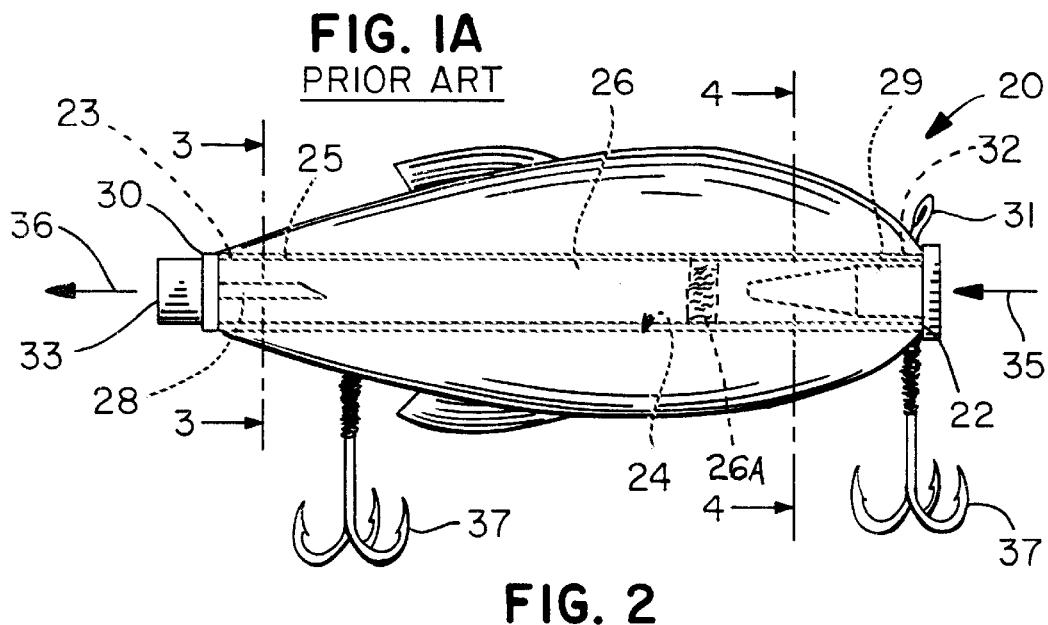
FIG. 2
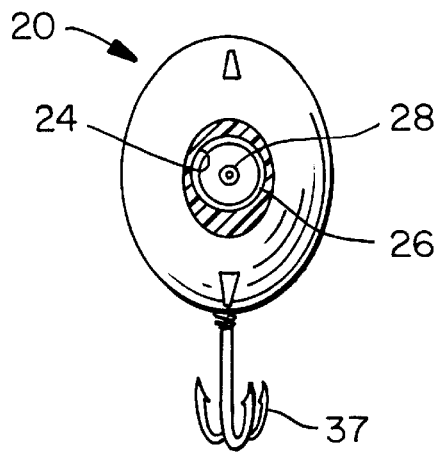
FIG. 3
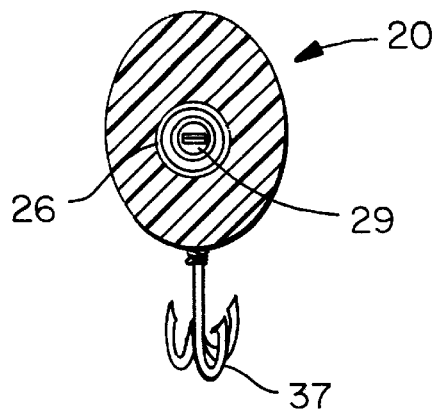
FIG. 4

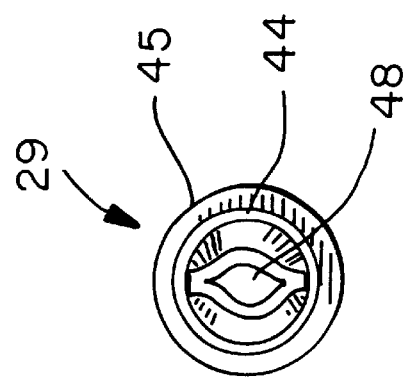
FIG. IOE
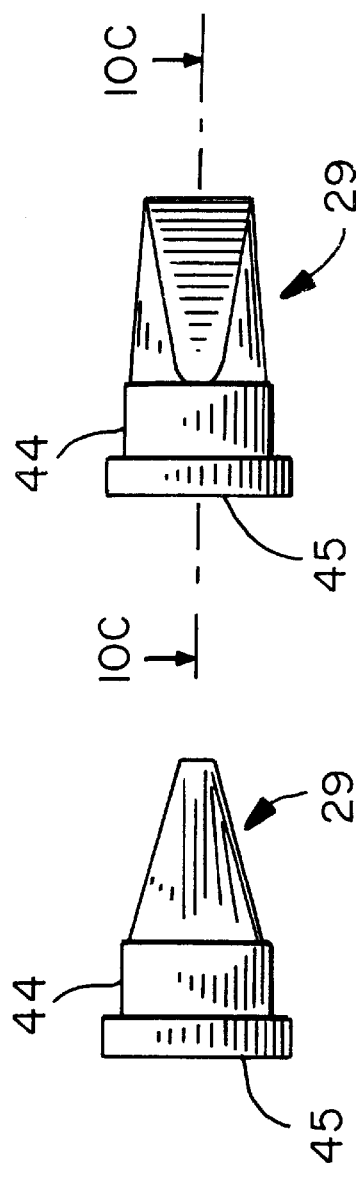
FIG. IOB
FIG. IOA
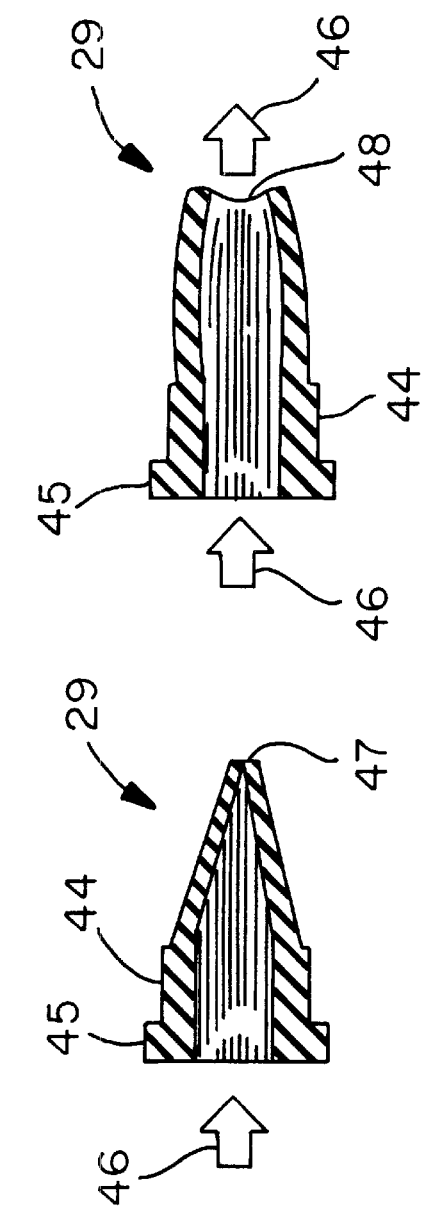
FIG. IOD
FIG. IOC

FISHING LURE

FIELD OF THE INVENTION

The herein disclosed invention is directed to fishing lures which are to be employed to allow for catching fish more efficiently.

BACKGROUND OF THE INVENTION

From time immemorial fishermen have made improvements and perfected means for more efficiently catching fish. Fishermen have employed various types of baits and various scents to attract fish to the hook. Artificial lures that attract fish are commercially available. A method presently in use simply sprays the attraction scent on the lure, then the spray-scented lure is used to catch fish. It is not difficult to understand that this method of spray-scenting a lure is inefficient because the scent is rapidly washed away by water surrounding the lure.

PRIOR ART PATENTS

Rivard (U.S. Pat. No. 5,155,947) discloses a scented fishing lure designed to controllably release fish attractant during trolling in a body of water, thereby attracting fish. The fishing lure has an internal cavity into which fish attractant is introduced through an entry aperture. When the lure is being trolled, water enters through the entry aperture, flows through the internal cavity and disperses out through an exit aperture flushing out a small amount of fish attractant with it. A baffle located within the internal cavity controls the flushing of the fish attractant.

Mounsey (U.S. Pat. No. 3,835,572) shows a lure with a bait containing compartment. The bait is fed into the compartment with a syringe or gun. There is a valve built into the device to prevent premature discharge of attractant.

The device of the herein disclosed invention is distinct from that of Mounsey in that the inventive device of this invention depends upon a needle disposed within the lure to penetrate a seal at the end of a tube to release attractant. With the device of this invention, there is no need to use an expensive syringe to inject the attractant. In addition with the use of tubes of this invention, there will be less handling and therefore less waste of attractant. The needle and punctured tube of this invention is obviously simpler to use.

Morita (U.S. Pat. No. 3,987,575) teaches a fishing lure wherein a scented capsule is placed and contained in a chamber within the lure. In order to be used a pin is inserted into the capsule to allow the oil to escape from the capsule and thus the lure is ready for fishing. The Morita device is inefficient because with a single pin-hole in the capsule the fluid therein would have difficulty escaping because of a vacuum created in the capsule. On the other hand, the inventors have invented a fish lure wherein a check-valve has been incorporated for facilitating the release of attractant from the vial.

Thomas (U.S. Pat. No. 4,554,756) discloses a prepared fish food package removably mounted on the shank of a hook. The package is in the form of a tube having separate compartments for the bait. These bait compartments are used sequentially by the fisherman by merely puncturing the tube nearest to the hook.

Brown (U.S. Pat. No. 4,267,658) discloses a fishing lure with a hollow internal cavity for containing attractant which is able to leach through holes built into the lure. The lure has the smell and taste of natural baits for the purpose of attracting fish. Different models are provided. Each has a hollow lure body containing cut up or ground up frozen bait or else replaceable cotton saturated with a combination of liquid fish extracts for salt or fresh water fish. The body is perforated with openings, so that the scent can ooze out of the lure body gradually and into the water.

Walker (U.S. Pat. No. 4,962,609) teaches a fibrous material in recesses formed on opposite sides of the lure. This fibrous material is impregnated with a scent for attracting the fish. The scent is gradually dispensed into the water as the lure is moved forwardly.

Gibbs (U.S. Pat. No. 4,888,907) discloses a lure having an internal bladder holding attractant which can be released by virtue of pressure differentials. The expanding (and contracting) bladder is coupled to the lure body by a valve, thereby providing a metered discharge passage for the attractant in the bladder.

Gruelle (U.S. Pat. No. 4,964,235) shows a scent-dispensing fishing line. The lure has an internal cavity receiving a fish-attracting liquid. An inlet port at the front end of the cavity allows entry of the water into the cavity. The water is mixed with the scent and is discharged through an outlet opening at the rear of the cavity in the lure.

Lawler (U.S. Pat. No. 4,998,370) teaches an artificial bait comprising a pellet having a paraffin base as a carrier. The paraffin is melted and mixed with a fish oil, molded into the desired shape, and cooled. The bait is part of the hook and may be tailored for attracting crabs, fish, lobster, crayfish, etc.

Bommarita (U.S. Pat. No. 5,321,906) discloses an inflatable bladder with the scent under pressure therein. The scent is released in the vicinity of a lure. The release of the scent is at a controlled rate.

Polley (U.S. Pat. No. 4,602,459) discloses a scented fluid stored in a float tank at the water's surface. The scent is released into a fish-like bait body below the water surface through a tube. This bait body has gills through which the scented fluid is discharged into the water to attract the fish.

Buccilli et al (U.S. Pat. No. 4,890,411) discloses a fish-attracting pellet connected to the line. This pellet is made from a material which slowly dissolves in the water. Alternatively, the pellet may be made of a non-porous but soluble material impregnated with fish-attracting pastes and liquids. The shank of a hook may be embedded in the pellet.

All of these prior art references, while interesting, have certain disadvantages and deficiencies; and to the best of our information and belief, are not commercially available nor widely used.

None of the prior art patents show a lure having a special hollow needle arrangement disposed within the lure to receive a diaphragm-capped tube with the tube having a check valve and containing fish attractant. The lure with such a tube is to be used for dispensing liquid fish attractant.

OBJECTS OF THE INVENTION

The herein disclosed invention has as a primary object the supplying of a fishing lure which will efficiently and economically supply an attractant-scent.

A further object of this invention is to provide a fishing lure able to meter out specific quantities of fish attractant while in the water.

A special object of this invention is to provide a kit of color coded vials containing designated attractants.

A main object of this invention is to provide an easy to use method of applying an attractant to a fish lure.

BRIEF SUMMARY OF THE INVENTION

The invention is directed to a fishing lure able to efficiently dispense an attractant.

The invention in its broadest sense envisions a scent releasing fishing lure comprising a fishing lure having a compartment containing a hollow needle (needle valve) with a point and being able to pierce the cap of a vial containing fish attractant so as to cause the release of attractant from the vial.

The lure has a elongated body having an anterior end and a posterior end, and a compartment within the lure having disposed therein a hollow needle or needle valve for receiving a vial of attractant. The compartment has an anterior passage opening for inserting the vial of a attractant and posterior opening having fixedly inserted therein a needle valve.

The invention envisions a method of fishing comprising (1) providing a fishing lure with a hollow compartment containing therein a hollow gauge needle having a point for puncturing a rubber or plastic diaphragm on a capped vial containing attractant liquid; (2) inserting said capped vial into the compartment such that the needle point of the needle valve punctures the cap of the vial allowing attractant liquid to be free to escape through the hollow gauge of the needle or needle valve and employing the lure and escaping attractant liquid in a fishing operation.

The invention also envisions a method of constructing a fishing lure comprising supplying a hollow gauge needle having a point end and a posterior end and molding a fishing lure around the hollow gauge needle such that there is a compartment at the point end of the needle for receiving a rubber or plastic capped vial and an opening at the opposite end of the compartment for receiving said rubber or plastic capped vial. The hollow gauge of the needle being able to puncture said rubber or plastic capped vial allowing for the escape of attractant out of the posterior end of the needle during a fishing operation.

A significant component of the herein described invention is a kit containing tubes of liquid attractant in which the tubes in the kit are multicolored with each color identifying a specific attractant relative to a specific fish species, and wherein the tube has a puncturable diaphragm at one end and a check-valve at the other. With this kit, the fisherman is able to select by color the tube most effective for catching a specific type of fish.

An important aspect of the invention is a kit containing a fishing lure which releases liquid attractant comprising (a) a fishing lure having a hollow compartment containing a hollow needle valve with a point and being disposed so as to be able to pierce the cap of a tube containing liquid fish attractant and (b) a container containing a series of multicolored vials with a specific color vial identifying a specific liquid attractant. The tube has a cap at one end and a check-valve at the other.

A broad aspect of this invention contemplates a tube able to contain a liquid fish attractant wherein a check valve is attached to one end of the tube to assure that attractant leaves the tube through the proper end, at the proper time, and the other end of the tube has a puncturable diaphragm.

These and other objects of the present invention will become apparent from a reading of the following specification taken in conjunction with the enclosed drawings.

BRIEF DESCRIPTION OF THE DRAWINGS

FIG. 1A is a longitudinal cross-sectional view of a prior art scented-fishing-lure; with FIG. 1B being a rear elevational view thereof.

FIG. 2 is a longitudinal elevational view illustrating a fishing lure of this invention.

FIG. 3 is a sectional view taken along lines 3—3 of FIG. 2.

FIG. 4 is a view taken along lines 4—4 of FIG. 2.

FIGS. 10A–10E are views illustrating the check valve.

FIG. 10A is a plan view of the check-valve.

FIG. 10B is a view thereof with the check-valve turned 90°.

FIG. 10C is a sectional view taken along lines 10B—10B of FIG. 10B with the valve being closed.

FIG. 10D is a sectional view taken along lines 10B—10B with the valve being open.

FIG. 10E is an elevational view at the right end of the check valve with the valve open.

DESCRIPTION OF THE PREFERRED EMBODIMENTS

Figure 5:
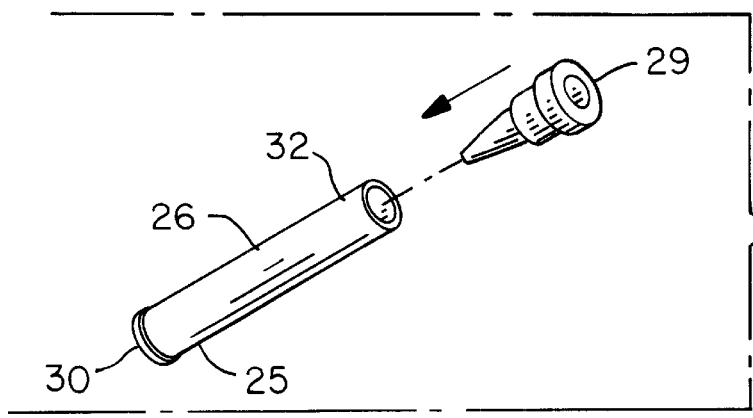
FIG. 5 is a view illustrating the diaphragm capped tube and check-valve of this invention.

In order to understand clearly the nature of the invention and the best means for carry it out, reference may be had to the drawings in which like numerals denote similar parts through the several views.

In FIGS. 1A and 1B, a scented-fishing lure 10 of the prior art has an attractant scent-containing capsule 12 contained within a chamber 13. A retractable spring arm 14 is provided with a pinhole 16. The retractable spring arm 14 has a middle portion 17 which can be pulled down to retract the spring-arm to allow for inserting a scent-containing capsule 12 into the capsule-chamber 13. Once the capsule is in the chamber and the spring is in its nesting position, a needle 18 can be inserted into the pinhole 14 to puncture the capsule 12 and allow for the release of attractant scent.

Referring to FIGS. 2–4, a lure 20 of this invention has a passage opening 22 to a vial area 24 wherein the anterior end 25 of vial 26 has a needle 28 inserted into the cap 30 of the vial 26. Vial 26 may have a filter 26A therein, thereby protecting the needle 28 against becoming clogged. Vial 26 has a check valve 29 at its posterior end 32 opposite the cap 30. This check valve 29 allows water to flow into vial 26 and thus forces liquid attractant out of vial 26 into hollow needle 28 and out of posterior portion 33 of needle 28. The flow of water into and out of the attractant containing tube is best shown by arrows 35 and 36, respectively, in FIG. 2. The posterior portion 33 of the needle 28 is fixed and made stationary in the lure 10 as by molding or gluing. The posterior portion 33 of the needle is shown out of the lure, however the needle could be placed entirely within the lure. Hooks 37 are shown attached to the lure. Also attached to lure 20 is a tow ring 31. During a trolling operation the tow-line 41 is to be attached to ring 31 (FIG. 8).

Referring to FIG. 5, a vial or tube 26 has a cap or diaphragm 30 at its anterior portion 25 and a check-valve 29 to be inserted into its posterior portion 32.

Figure 6:
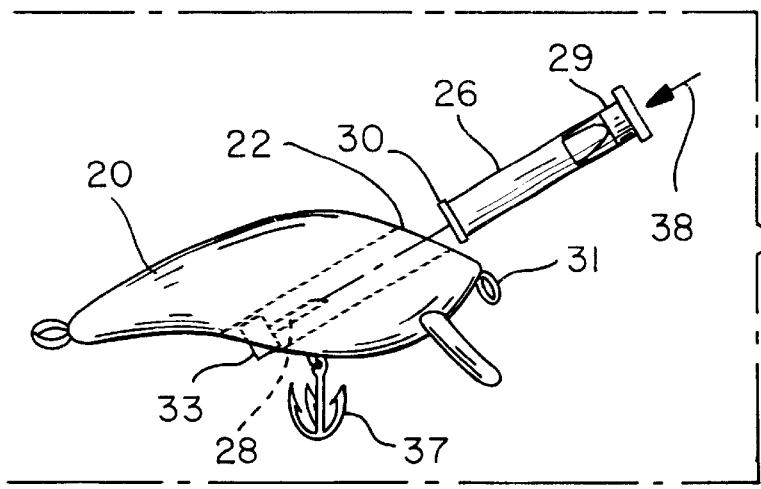
FIG. 6 is a view of the lure with the vial about to be inserted into the lure.
Figures 7, 8:
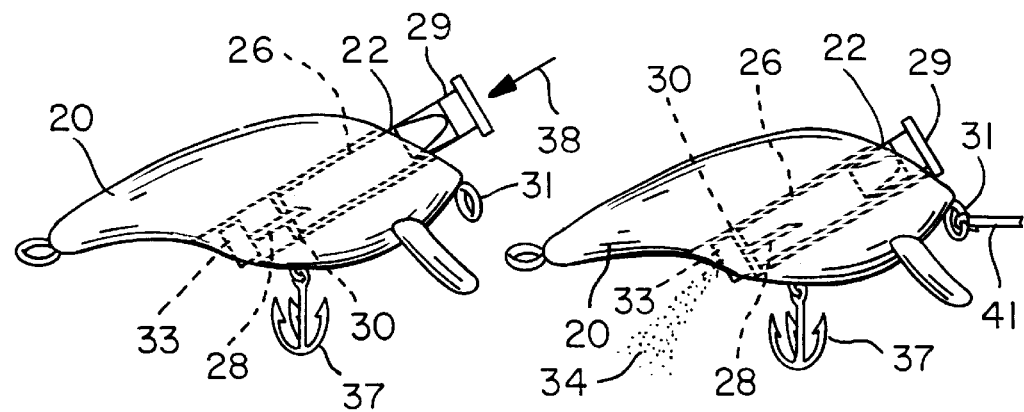
FIG. 7 is a view of the vial partially inserted into the lure.
FIG. 8 is a view of the lure with the vial completely inserted.

With reference to FIGS. 6–8, the vial 26 containing attractant fluid is inserted into passage opening 22 (FIG. 6). The arrow 38 shows the direction in which the vial 26 is being inserted. Once in passage 22, the vial 26 is inserted further until the needle 28 punctures cap 30 allowing attractant fluid 34 to escape into needle 28 (FIG. 7). With reference to FIG. 8, once the cap 30 is punctured and attractant 34 is able to flow from the posterior portion 33 of the needle 28, the lure 20 is placed in the water ready for catching fish. As best shown by FIG. 8, a tow-line 41 is inserted into tow ring 31 and is used to tow the lure causing attractant fluid 34 to escape into the water to attract fish to the lure.

Figure 9:
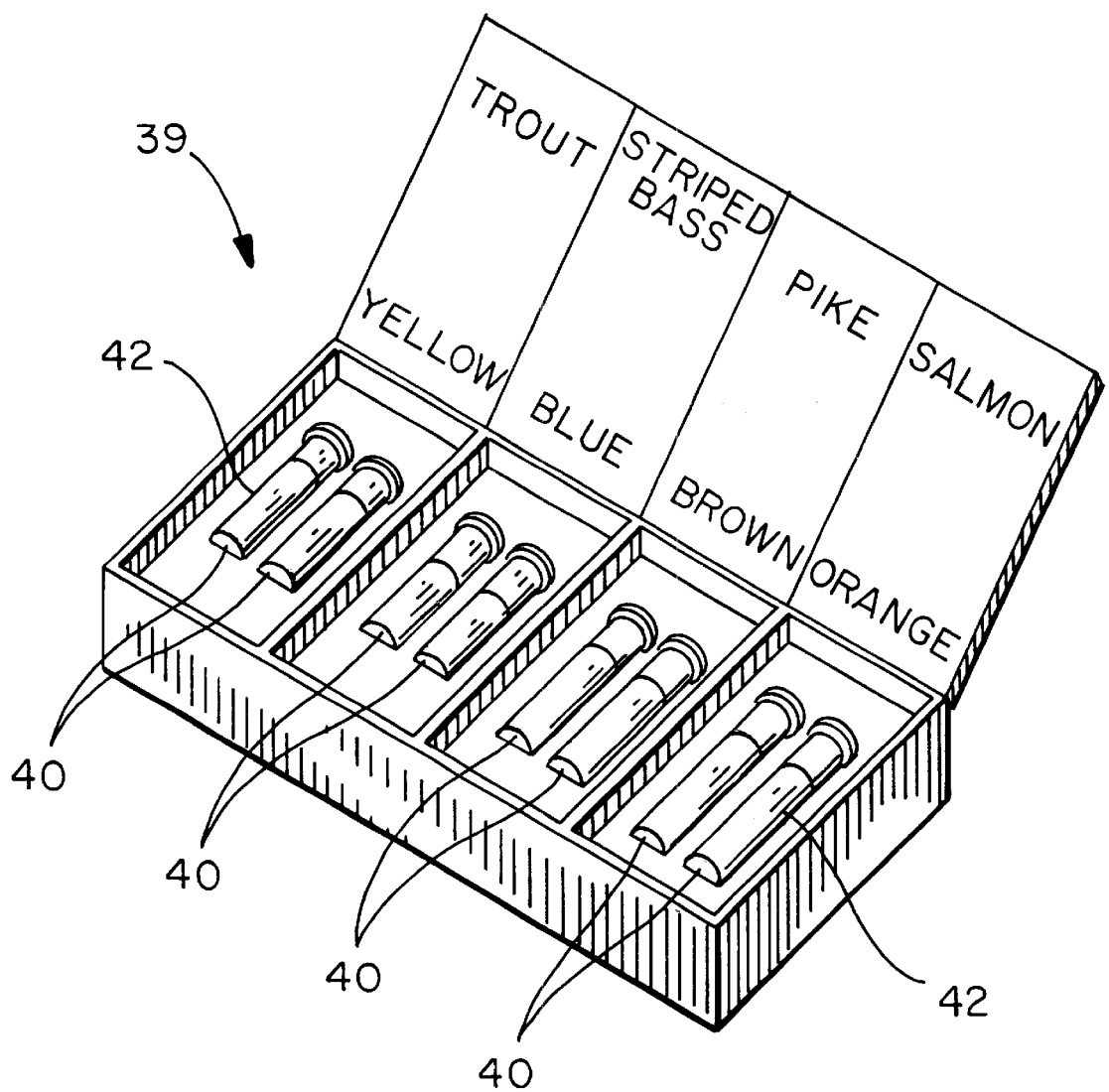
FIG. 9 is an illustration of a kit containing vials of different types of attractants with each vial color-coded to identify the specific type of attractant.

With reference to FIG. 9, a kit 39 has therein color coded vials 40. Each specific color 42 on the vial 40 identifies a specific attractant for a specific fish species. Each vial contains a specific oil or liquid attractant relished by a specific fish-species.

Applicants intend to formulate their own liquid attractant to include in capped check-valved vials. The inventors recognize that specific fish are attracted to specific baits. Such as for example:

| Fish | Attractant Bait |
|---|---|
| Bass | 1. Minnows |
| | 2. Leeches |
| | 3. Frogs |
| | 4. Craw Fish |
| | 5. Salamanders |
| | 6. Shrimp |
| Trout | 1. Salmon Eggs |
| | 2. Worms |
| | 3. Cheese |
| Catfish | 1. Minnows |
| | 2. Sun Fish |
| | 3. Craw Fish |
| | 4. Frogs |
| | 5. Shrimp |
| | 6. Garlic |
| | 7. Live Stock Blood |
| Pike and Muskie | 1. Grubs |
| | 2. Lizards |
| | 3. Night Crawlers |
| | 4. Shad |
| | 5. Frogs |
| Walleye | 1. Minnows |
| | 2. Leeches |
| | 3. Night Crawlers |
| | 4. Shad |
| | 5. Frogs |
| Pan Fish | 1. Worms |
| | 2. Grubs |
| | 3. Maggots |
| | 4. Minnows |
| | 5. Leeches |
| Salmon | 1. Salmon Eggs |
| | 2. Minnows |
| Blue Fish and Stripe Bass | 1. Shrimp |
| | 2. Crab |
| | 3. Eel |
| | 4. Minnows |

The inventors intend to liquify solid attractant baits for use in the vial. The liquid attractant for this invention can be made by making a liquid extract of the solid bait or grinding and emulsifying the bait to liquify it. Alternatively, the solid bait can be extracted with water and the aqueous extract used in the vial as the attractant. Fish oils can be added to the-liquified attractant to enhance effectiveness. It is also to be pointed out that commercial liquid attractants are on the market that can be used in the tubes of this invention.

FIGS. 10A–10E are views of the check valve 29 employed with the capped or diaphragmed tube 26 of this invention. The check valve is inserted into the tube as shown in FIG. 5. FIG. 10A is a plan view of the check valve, with FIG. 10B being a view of the check valve of 10A turned 90°. Referring to FIG. 10C, a cross-section of the check valve taken along lines 10C—10C of FIG. 10B and shows the valve closed. FIGS. 10D and 10E show the valve open. The sequential arrows 46 show the flow of water through the valve to open the valve (FIGS. 10D and 10E). Of course, with the attractant-containing tube out of water, the valve will be closed (FIG. 10C) to preclude the attractant liquid from escaping from tube 26. As best shown in FIGS. 5 and 10A–10E, a check valve 29 is inserted into tube 26. Collar 44 is inserted into the posterior portion of the vial 32. Flange 45 aids in ensuring a snug fit for the check valve 29 in the tube 26. The check valve 27 can be set in position by a friction fit at collar 44, however gluing or like fastening is preferred. The arrows 46 show the direction that water will take going through the check valve 29 and into tube 26. Before water enters the check valve, it is closed 47 (FIG. 10C). With water flowing through the check valve, the valve will be open 48 (FIGS. 10D and 10E).

The check valve 29 used with tube 26 is commercially available and can be similar to that used on "bubblers" in a fish tank. Other types of check-valves allowing only for a one way transit IU would be operative. A flap-type or ball-type as well as other types of valves would be operative for use in the herein disclosed invention.

The expressions vial and tube have been used interchangeably to identify a container holding attractant fluid. One end of the container has a puncturable cap or diaphragm 30; the other end has a one-way check valve 29.

With reference to cap 30 on vial 26, the invention preferably employs a rubber-diaphragm capped vial which is to be punctured by the needle 28. A rubber capped glass or plastic vial or tube is a preferred embodiment of this invention.

In this application the expression rubber capped vial has been employed. It is to be understood that the cap to the vial can be any non-permeable puncturable material such as plastic, etc., and the vial can be made of glass, plastic or like material as understood and appreciated by those skilled in the art. Instead of a glass or plastic rubber capped vial, a simple gelatin or plastic capsule-like container of attractant could be employed. The important consideration here is that the gelatin or plastic be puncturable and that the container be supplied with a check valve.

The needle 28 used in this invention is a hollow needle or needle valve. Hollow needles are well known in industry and are particularly well known in the medical field and also known to be used to fill inflatable balls and like devices. These hollow needles come with different bore sizes or gauges. By selecting a needle with a specific bore size a known and specific amount of attractant can be released over a set period of time. The diameter of the hole in the tube (made by the needle) will vary the fluid flow. The proper bore size for use can easily be determined by those skilled in the art.

The herein disclosed invention envisions lures having a variety of differently gauged needles. The lure device can be equipped so as to receive a variety of different size (gauge) needles. This can be accomplished by having the lure fitted to receive a tapped needle or the lure could be fitted so as to receive a needle by press-fitting or some other detent means. Besides controlling the dispensing of the liquid attractant with the bore size of the needle, the dispensing of attractant can be controlled by the viscosity of the liquid. The inventors contemplate a scented liquid attractant to last several hours.

As an embodiment of this invention, it is possible to fashion a lure with multiple compartments and multiple needles to receive multiple vials of attractant. In this way, attractants of different scents could be used simultaneously during a fishing operation.

Applicants envision adding a coloring agent to their attractant liquid. With the added coloring agent, the user will be able to see the color of the attractant 34 and know when it is dissipated and add a fresh vial of attractant to the lure. A major advantage of using the coloring agent and attractant envisioned by this invention is the fact the dye will be FDA approved. Accordingly, the attractant will be non-toxic and will not impact adversely on the environment, and therefore, the colored and scented attractant will not present regulatory concerns.

As a further embodiment of this invention, the vials as well as the liquid attractant can be color-coded. The colored liquid attractant has advantages over the colorless attractant supplied commercially which is sprayed externally onto the lure. The commercial external spray is quickly washed away and the fisherman does not know exactly when such a clear liquid has been washed away.

A special embodiment of this invention involves a kit 39 containing color coded vials. Each specifically color coded vial will contain a specific oil attractant or other liquid attractant specific to a species of fish sought to be caught. Besides adding oil as an attractant, the inventors envision adding various species-specific scents to the attractant.

The scent may be color-coded in different ways, as follows:

First, by the type of fish, as for example:

Green for bass.

Yellow for trout.

Black for catfish.

Brown for pike and muskie.

White for walleye.

Purple for pan fish.

Orange for salmon.

Blue for striped bass.

Second, by the type of scent in the vial or tube 36, as for example:

Orange for salmon eggs.

Deep pink for shad.

Dark red for blood.

Brown for minnows.

Green for frogs.

Gold for crawfish.

Black for salamanders.

Purple for worms.

Third, by the type of water you are fishing in (brackish, salt or freshwater) since, generally, most of the fish living in the same type of water are going to have the same food supply.

Fish-attracting scents are currently available on the open market. One such supplier is Berkley Outdoor Technologies Group, One Berkley Drive, Spirit Lake, Iowa 51360.

Many advantages flow from the use of this invention.

1. The invention provides for a clean, neat, quick and inexpensive method for adding an attractant to a lure.
2. The lure of the invention allows for accurate metering of attractant based on the gauge of the needle and viscosity of attractant, thereby providing a sustained release of the scent (as for example, up to two hours).
3. The invention provides for a check valve so as to preclude attractant fluid from escaping from the vial when it is not in use.
4. There is no need to refill bladder-like lures.
5. There is no need to put scented bait or blood worms on a hook.
6. The lure can be used in casting as well as trolling.
7. The scent will have a color. In relatively clear water, you can look down and see if the color is basically gone, indicating that the scent is filly dissipated. So you know that the disposable tube must be replaced.
8. The respective scents are color-coded for different fish, and a convenient kit of respective vials is provided.
9. All of the scents are non-toxic, FDA approved, and will have no adverse effect on the environment.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An attractant releasing fishing lure system comprising a fishing lure having a hollow compartment containing therein a hollow needle with a point; a tube containing liquid fish attractant which is insertable into the compartment; wherein the hollow needle being disposed so as to be able to pierce a diaphragm of the tube containing liquid fish attractant when the tube is inserted into said compartment and to cause the release of attractant from the tube and wherein said diaphragm is at one end of the tube and a check valve is at the other end of the tube.

2. A method of fishing, comprising the steps of providing at least one tube having a check valve assuring one-way flow of water through the tube and a fish-attracting scent therein, providing a fishing lure having an opening therein, inserting the tube into the opening in the lure, such that the tube is punctured, metering the fish-attracting scent out of the lure such that there is a sustained release of the scent, and the scent having a coloring agent, such that the fisherman can look down into relatively-clear water and see when the color and hence the scent has been used up, and thereafter retracting the lure, removing the tube, and inserting another tube having a fish-attracting scent into the lure.

3. The method of claim 2, further including the step of providing a plurality of tubes, each of which carries a respective scent, and the tubes being color coded for respective fish.

4. The method of claim 2, further including the step of providing a hollow needle within the lure, such that the hollow needle punctures the tube when the tube is inserted into the lure.

5. The method of claim 3, further including a filter within the tube, thereby preventing the hollow needle from becoming clogged.

* * * * *